(12) United States Patent
Chung

(10) Patent No.: US 10,866,935 B2
(45) Date of Patent: Dec. 15, 2020

(54) FILE MANAGEMENT METHOD

(71) Applicant: Benjamin J. Chung, Anaheim, CA (US)

(72) Inventor: Benjamin J. Chung, Anaheim, CA (US)

(*) Notice: Subject to any disclaimer, the term of this patent is extended or adjusted under 35 U.S.C. 154(b) by 733 days.

(21) Appl. No.: 15/680,644

(22) Filed: Aug. 18, 2017

(65) Prior Publication Data

US 2019/0057111 A1 Feb. 21, 2019

(51) Int. Cl.
| | |
|---|---|
| *G06F 16/182* | (2019.01) |
| *H04L 29/08* | (2006.01) |
| *G06F 16/16* | (2019.01) |
| *G06F 16/25* | (2019.01) |
| *G06Q 10/10* | (2012.01) |
| *G06F 16/93* | (2019.01) |
| *G06F 3/0482* | (2013.01) |
| *G06F 3/0486* | (2013.01) |
| *G06Q 40/00* | (2012.01) |
| *G06F 40/186* | (2020.01) |

(52) U.S. Cl.
CPC .......... *G06F 16/183* (2019.01); *G06F 16/168* (2019.01); *G06F 16/252* (2019.01); *G06F 16/93* (2019.01); *G06Q 10/10* (2013.01); *H04L 67/02* (2013.01); *G06F 3/0482* (2013.01); *G06F 3/0486* (2013.01); *G06F 40/186* (2020.01); *G06Q 40/00* (2013.01); *H04L 67/04* (2013.01); *H04L 67/1097* (2013.01)

(58) Field of Classification Search
CPC ...... G06F 16/183; G06F 16/93; G06F 16/168; G06F 16/252; H04L 67/02; G06Q 10/10
See application file for complete search history.

(56) References Cited

U.S. PATENT DOCUMENTS

| | | | |
|---|---|---|---|
| 7,194,678 B1* | 3/2007 | Koike | G06F 16/972 707/E17.117 |
| 8,595,381 B2 | 11/2013 | Long | |
| 9,395,893 B1 | 7/2016 | Beausoleil et al. | |
| 9,471,708 B2 | 10/2016 | Ergar | |
| 2007/0239760 A1* | 10/2007 | Simon | G06F 16/954 707/999.102 |
| 2008/0059873 A1* | 3/2008 | Oezgen | G06F 16/31 707/E17.083 |

* cited by examiner

*Primary Examiner* — Kannan Shanmugasundaram
(74) *Attorney, Agent, or Firm* — Clement Cheng

(57) ABSTRACT

A method for managing files includes the steps of connecting a first client and a second client to the Internet, through a web service, configuring a server on the web service, then, configuring an extensible web server on the server, configuring a local file system to connect to the extensible web server, configuring a relational database management system to connect to the extensible web server, and configuring a front end web application framework on the extensible web server. The front end web application framework provides and builds a graphical user interface for the user. A back end web application programming interface is connected to the front end web application framework. The backend web application programming interface is also configured on the extensible web server.

4 Claims, 16 Drawing Sheets

FILE MANAGEMENT METHOD

FIELD OF THE INVENTION

The present invention is in the field of computer file management methods.

DISCUSSION OF RELATED ART

When processing financial documents such as auditing a financial statement, users have a variety of different methods for organizing the computer database to organize workpapers and other documents. Workpapers are documents generated by the auditor during an audit. Sometimes a template can be used where forms are created and stored on the computer. Typically, these documents are stored on the local file system of a server. The server can be hosted on a cloud for example. Most users use the local file system for managing documents.

In the field of financial accounting, auditing often requires a large number of workpapers to be stored as documents. Documents are generated by the auditor during an audit. These documents are electronic documents in formats such as PDF, text and RTF. These documents often are forms that are stored on a drive and managed with a computer operating system. The forms have standard fixed text and fields for receiving customizable text entries. Unfortunately, using the operating system, assigning numerous custom properties to various documents and files becomes difficult.

A variety of different managing systems have been created over the years to help alleviate the problem. For example, file management system as described in U.S. Pat. No. 9,395,893 filed May 29, 2015 by Dropbox, Inc. discloses a content management system that can provide a graphical user interface (GUI) that integrates communications and content management into a single user interface. The user interface can include mechanisms that allow a user to provide input to generate a new workspace. The user interface can present representations of content items associated with the workspace and allow the user to provide input to generate, view, edit, and share content items associated with the workspace.

Some management systems are also capable for placing applications and their associated data into a colocation data center, wherein application placement module is configured to perform an assortment of functions. For example, Ergar et al, in U.S. Pat. No. 9,471,708, filed Oct. 18, 2016, discusses a management system that is capable of constructing a facility communication node graph; constructing a composite elastic map which represents the compute nodes in the colocation data center; associating a force function between two nodes based on communication bandwidth; constructing an application usage data space; inserting the node graph into the application data space; assigning the applications to the compute nodes; associating a force function between each application and each compute node based on the assignment; determining an elastic map energy (EME) for the elastic map, wherein the EME is the total energy of the system; and assigning the real-world applications to the real-world compute nodes in the data center if the EME is less than a threshold energy.

Another management system uses hierarchical file synchronization in managing computer files. Inventor Byron Long in U.S. Pat. No. 8,595,381 and filed Nov. 26, 2013, discloses a method of maintaining a computer file in synchronicity between multiple computers. Likewise, Bong et al in United States patent 2016/0027123A1 discloses a method for automatically tagging a trial balance. This system uses a communication interface configured to receive the trial balance in a user specific format. Information is provided to display at least a portion of the first data subset of the trial balance identified as the first data grouping and to display at least a portion of the second data subset of the trial balance identified as the second data grouping to facilitate user verification of the identification of the first data subset as the first data grouping and the identification of the seconds data subset as the second data grouping.

SUMMARY OF THE INVENTION

A method for managing files includes the steps of connecting a first client and a second client to the Internet, through a web service, configuring a server on the web service, then, configuring an extensible web server on the server, configuring a local file system to connect to the extensible web server, configuring a relational database management system to connect to the extensible web server, and configuring a front end web application framework on the extensible web server. The front end web application framework provides and builds a graphical user interface for the user. A back end web application programming interface is connected to the front end web application framework. The backend web application programming interface is also configured on the extensible web server.

A relational database management system interface is configured on the extensible web server to access a relational database management system on the server. The relational database management system interface changes file properties of files stored on the relational database management system. A data access object is configured on the backend web application programming interface to access the relational database management system. Links are established on the backend web application programming interface that are displayed on the graphical user interface. Documents are stored as files on a local file system. The relational database management system provides a second file name shown as a link displayed on the graphical user interface. The system has an import function, that allows a user to select a file and replace the file that the link points to. The second file name is not changed during operation of the import function. The file has a set of file properties managed by the relational database management system. The file properties are not changed during operation of the import function.

The server also maintains a list of client templates, and maintains a list of workpaper templates, so that a client template is defined as group of workpaper templates. The method optionally includes a PBC function that has a PBC list that is updated so that a server notifies a user to upload documents according to the PBC list. Then, the server receives the upload from the user.

The server provides an upload function that configures a first link to point to a list of links to uploaded files. The server receives the uploaded files into the local file system of the server and provides a list of links to those files under a top layer link or first link. The server also provides an export function. The files that the list of links of files point to are downloaded to a client terminal in the same hierarchy as the list of links of files. The file links can be locked with a locking function. The file links have a status of locked and unlocked. The file links cannot be dragged and dropped by a user in the graphical user interface when in locked position.

Figure 1:
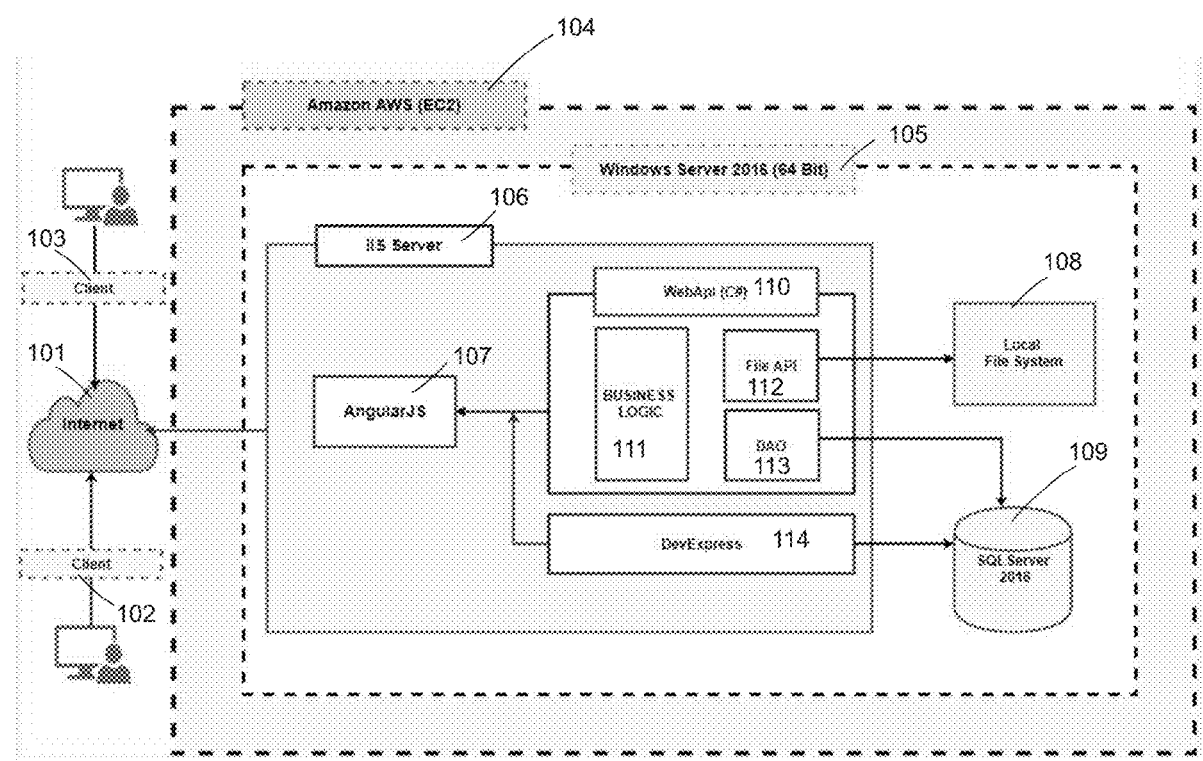
FIG. 1 is a system architecture diagram of the present invention.

The following call out list of elements can be a useful guide in referencing the elements of the drawings.

101 Internet
102 First Client Terminal
103 Second Client Terminal
104 Web Service, Such As Amazon AWS™—Amazon Web Service™
105 Server, Such As Windows Server 2016 (64 Bit)™
106 Extensible Web Server, Such As IIS Server—Internet Information Services
107 Front End Web Application Framework, Such As ANGULARJS—Angular Java Script
108 Local File System
109 Relational Database Management System, Such As SQL Server 2016—Structured Query Language
110 Backend Web Application Programming Interface Such As .Net Framework, Web Api (C #)—Web Application Programming Interface
111 Business Logic
112 File Interface, Such As File Api-File Application Programming Interface
113 Data Access Object, Also Called Dao
114 Relational Database Management System Interface Such As Devexpress™—Developer Express™
21 Template Selection Button
22 Template List
23 Client List Template Button
24 Workpaper List Template Button
25 Template Selection Area
26 Template Indicator
27 Detailed Template List
31 Workpaper Type Attribute
32 Workpaper Description Attribute
33 Actions Attribute
34 Number Attribute
35 Create File Window
36 File Type Attribute
37 Workpaper Reference
38 Workpaper Type
39 Workpaper Title
40 Select Folder
41 Select Template
42 Select File
43 Folder Selection Drop-Down Menu
44 Template Number
45 File Type
46 File Name
47 Client Creation Details Window
48 Client Creation Button
49 Client Creation Template Window
50 Template Subfolder
51 Template Subfolder List item
52 Workpaper Section Folder
53 Workpaper Section Subfolder
54 Workpaper Item
55 Window Tabs
56 Download Button
57 Downloaded File
58 Standard Spreadsheet Program
59 File Selection Import interface
60 Menu Function Selection Bar 61 Full-Screen View Button
62 Operating System File Name
63 Operating System File Folder
64 Workpaper Type Selection Menu
65 Uploaded File Link
66 Workpaper Reference Attribute Header
67 Document Name Attribute Header
68 Document Type Attribute Header
69 Actions Attribute Header
70 Number Attribute Header
71 Link List
72 File Locking Button
73 File Unlocked Designation
74 File Locked Designation
75 Pbc List Selection Button
76 Pbc Status Chart
77 User Assignment Menu
78 User Export
79 Planning File Export Button
80 User Planning Checklist Export Button
81 Compressed Export File
82 Uncompressed Export Files

DETAILED DESCRIPTION OF THE PREFERRED EMBODIMENT

Glossary

Amazon Web Service: Amazon Web Services is a subsidiary of Amazon.com and provides on-demand cloud computing platforms to individuals, companies and governments, on a paid subscription basis with a free-tier option available for 12 months.

Internet Information Services (IIS, formerly Internet Information Servers is an extensible web server created by Microsoft for use with the Windows NT family. IIS supports HTTP, HTTPS, FTP, FTPS, SMTP and NNTP.

Angular JS is a JavaScript based open sourcefront-end web application framework mainly maintained by Google and by a community of individuals and corporations to address many of the challenges encountered in developing single-page applications.

Local File System: A file system enables applications to store and retrieve files on storage devices. Files are placed in a hierarchical structure. The file system specifies naming conventions for files and the format for specifying the path to a file in the tree structure.

SQL Server: Microsoft SQL Server is a relational database management system developed by Microsoft.

Web API: ASP.NET WebAPI is a framework that makes it easier to built HTTP services that reach a broad range of clients, including browsers and mobile devices, ASP.NET Web API is an ideal platform for building RESTful applications on the .NET Framework.

BUSINESS Logic: Logic is an aspect of computer design concerning the fundamental operations and structures upon which all computer systems are built. Business logic includes the rules that are required for operating business.

File API: The file interface provides information about files and allows JavaScripts in a web page to access their content.

Data Access Object: A data access object is an object that provides an abstract interface to some type of database or other persistence mechanism. By mapping application calls to the persistence layer, the DAO provides some specific data operations without exposing details of the database.

DevExpress™: is an application that interfaces with the SQL server. DevExpress™ is also the name of a software development company founded in 1998 with headquarters in Glendale, Calif. DevExpress initially started producing UI Controls for Borland Delphi/C++ Builder and ActiveX Controls for Microsoft Visual Studios.

A document management system has a variety of different components. The Internet 101 connects a first client terminal 102 and a second client terminal 103 to a web service 104 such as a web hosting service. The web hosted server or web service 104 can be hosted by a hosting service. The web hosting service 104 can operate a virtual machine, or a server 105 such as Windows server 2016™. The server 105 can have an extensible web server 106 such as an internet information services IIS Server. The extensible web server 106 can include a front end web application framework 107 such as Angular JavaScript that receives data from a back-end web application programming interface 110 such as Web Api (C #). The backend web application programming interface 110 may include a file interface 112 such as a File API that interfaces with a local file system 108. The local file system 108 can be implemented as NTFS New Technology File System the backend web application programming interface 110 can also include all of the business logic 111 that provides the business rules for handling audits or other financial or management operations for example.

A relational database management system interface 114 in the extensible web server 106 can access a relational database management system 109 such as an as SQL Server also called a structured query language server. The relational database management system 109 is located on the server 105 and interfaces with the data access object 113. The data access object 113 is on the backend web application programming interface 110.

The present invention has a variety of different key functions for improving document management. The document management system has unique users that have their own login such as by a login name and password. The document management system organizes documents and has a variety of different features. The document management system opens files called client files. The user logs in and then opens or creates a new client file. The digital document management system (DMS) can provide additional features for managing documents that are not available on a standard computer operating system. The document management system receives data from a document database which can be a shared file folder stored on a distributed computer network such as a cloud. The document management system is an application that also provides a graphical user interface. The graphical user interface has filenames arranged in a hierarchy similar to most standard computer operating systems, however certain features provide improved document management capabilities. In addition to the hierarchical system, the document management system also retains a set of document properties. The document properties are retained in a document management system database. Users can define the document properties according to what the users select.

Workpaper templates can improve productivity. In each client file, the document management system stores workpaper templates in a template area. The user can create workpaper templates and then import them into the client file. Templates can be created and stored in the "Template" area of the graphical user interface. These templates can be Excel files or Word files. The document management system has a graphical user interface with a home screen. In the Home Screen section, there is a section called "Template" in the navigation section. Clicking on the template button provides two options including a workpaper template and a claim template, namely: (1) Workpaper and (2) Client. The Workpaper section allows the user to create Excel and Word file templates and have them stored. The user can create folders to separate types of areas and within the folder, sub-folders.

When the templates have been created and included in the appropriate category or folder, a user can open any templates stored in the client file when creating new workpaper. When creating a new workpaper such as by using a spreadsheet or text editor, the document management system provides an option to retrieve workpapers from stored templates. When a user clicks on the template button, preferably a dropdown bar provides a list of workpaper choices to the user.

Client templates can also improve productivity. The document management system opens client files and the client files can be saved as templates. When creating a new client, the user can choose to model the new client according to a saved template. Client templates can also be created and stored in the "Template" area of the graphical user interface. The workpaper structure can be set up based on type of job (e.g. audit, review, or compilation). Once a client template is created, when creating new client, the user can choose from already created client template list.

Figure 2:
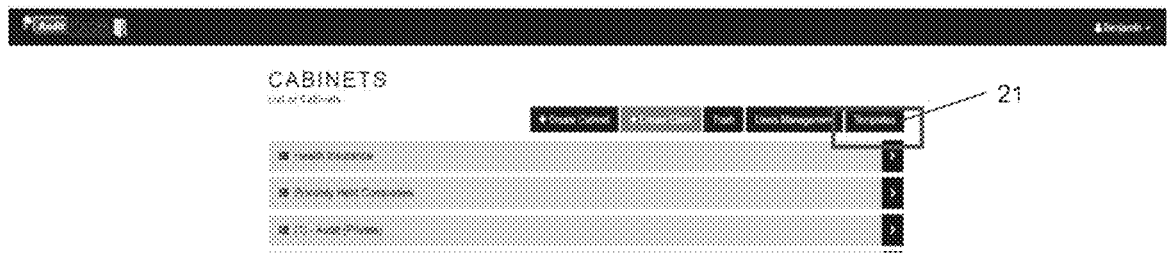
FIG. 2 is a view of the graphical user interface showing a template selection function.
Figure 3:
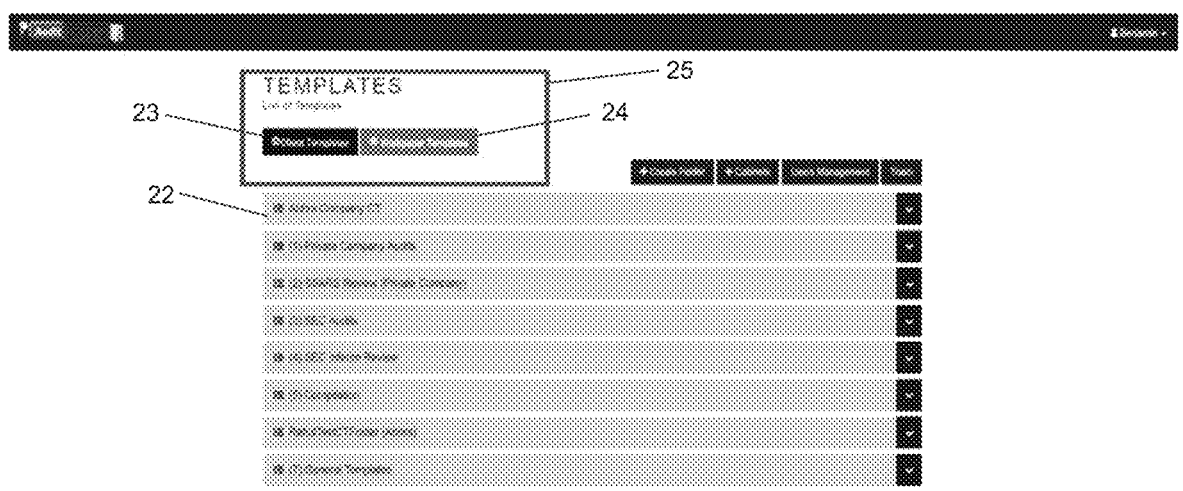
FIG. 3 is a view of the graphical user interface for creating the two types of templates.
Figure 4:
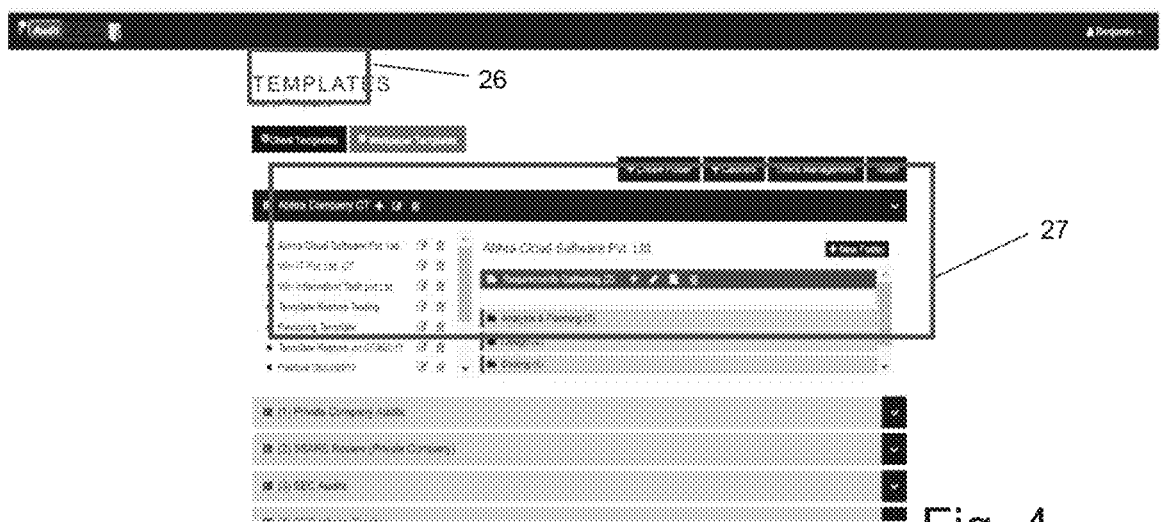
FIG. 4 is a view of the graphical user interface for creating client template.
Figure 5:
FIG. 5 is a view of the graphical user interface for creating workpaper templates.

The front end web application framework provides a graphical user interface that interacts with the backend. Therefore, the workpaper templates can be accessed in the graphical user interface by providing a template selection button 21, as seen in FIG. 2. Pressing the template selection button 21 opens the template list 22. The template list 22 includes a list of previously defined templates and the template list is a drop-down menu that can link to the templates. As seen in FIG. 3, the client template button 23 in the template selection area 25 allows a user to select client templates. Similarly, the workpaper list template button 24 allows a user to select workpaper templates. The template selection area 25 also has a template indicator 26 such as a header entitled 'Template'. A detailed template list 27 can extend outwardly from each item in the template list 22. The workpaper templates have a workpaper type attribute 31, a workpaper description attribute 32, an actions attribute 33, and a number attribute 34. The attributes can be managed and stored via the relational database management system.

Figure 6:
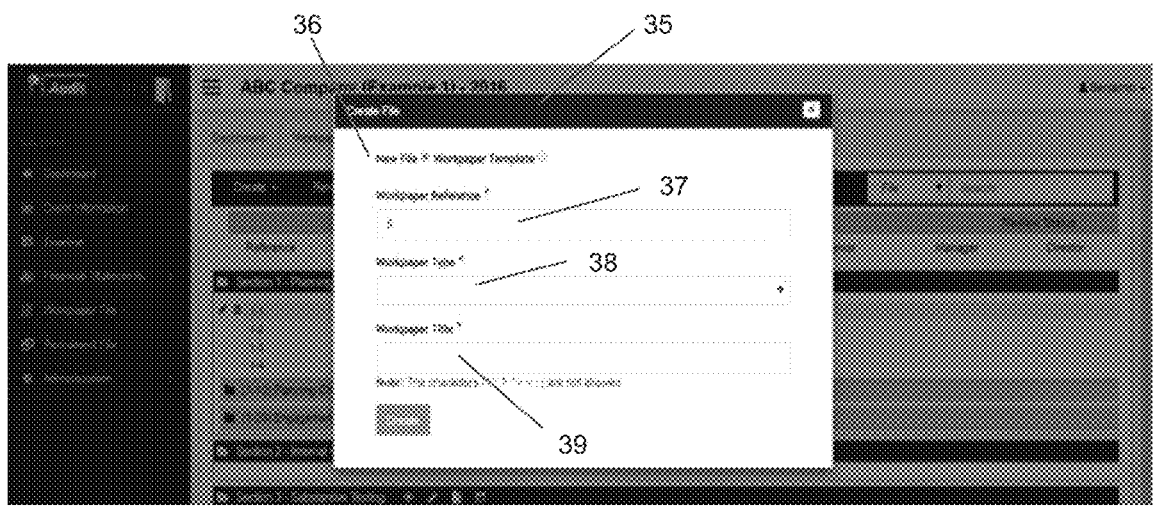
FIG. 6 is a view of the graphical user interface of the client screen for creating a new file or workpaper template once a client is created.
Figure 7:
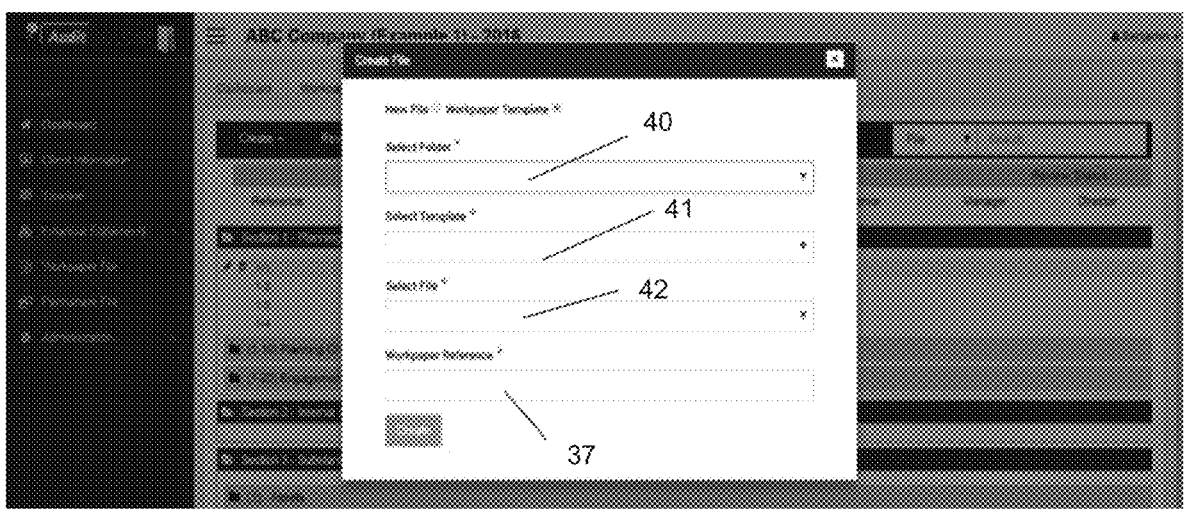
FIG. 7 is a view of the graphical user interface for viewing workpaper template.
Figure 8:
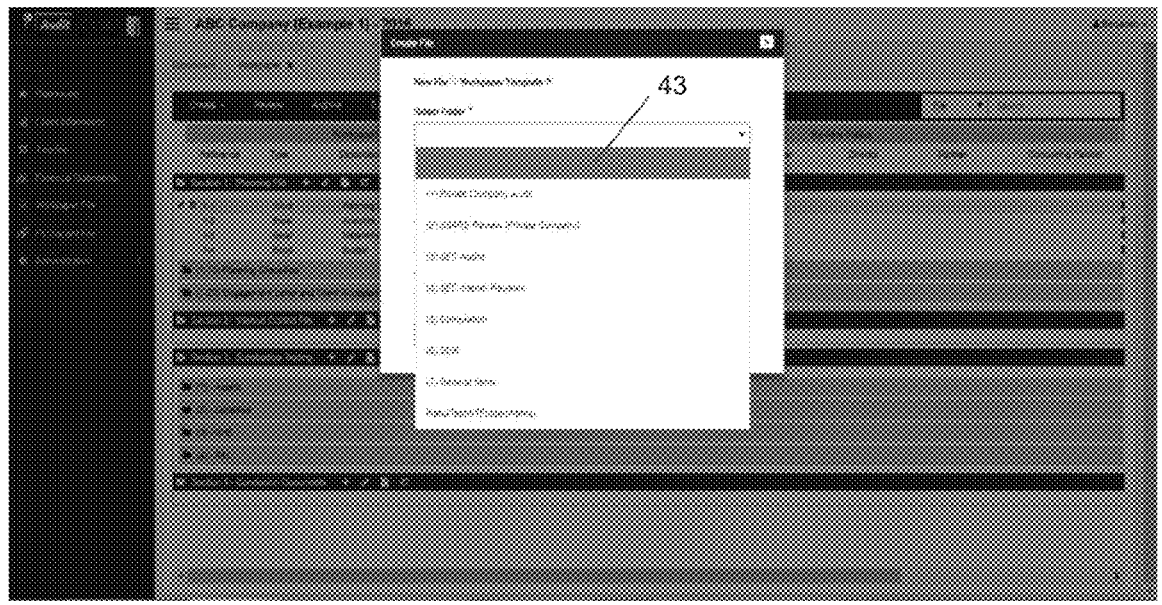
FIG. 8 is a view of the graphical user interface for selecting folders and sub-folders when searching for workpaper.
Figure 9:
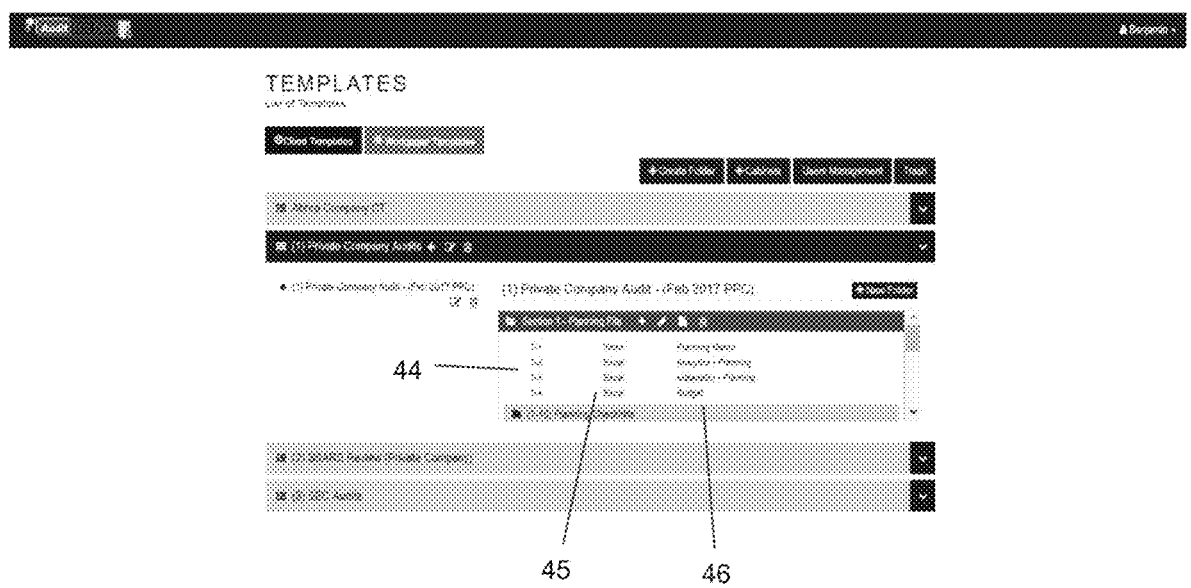
FIG. 9 is a view of the graphical user interface for creating client template.

As seen in FIG. 6, a create file window 35 allows a user to create a file and select a file type which is a new file, or a workpaper template in the file type attribute selection 36. When making a new file, a workpaper reference 37 is an attribute in the form of a number for ordering and organizing the workpapers into an outline format for example. A workpaper type 38 is another attribute that a user can select in the create file window 35. Additionally, the workpaper can have a workpaper title 39 that can also be entered in the create file window 35. When making a workpaper template, the create file window 35 allows a folder selection field called select folder 40. After the user selects the folder 40 from the drop-down menu, the user has the choice of selecting a template from the select template 41 drop-down menu. After the select template drop-down menu, the user can select a file in the select file 42 drop-down menu. The folder selection drop-down menu 43 provides a list of types of workpaper templates available. As seen in FIG. 9, the templates may additionally have a template number 44, a file type 45, and a file name 46.

Figure 10:
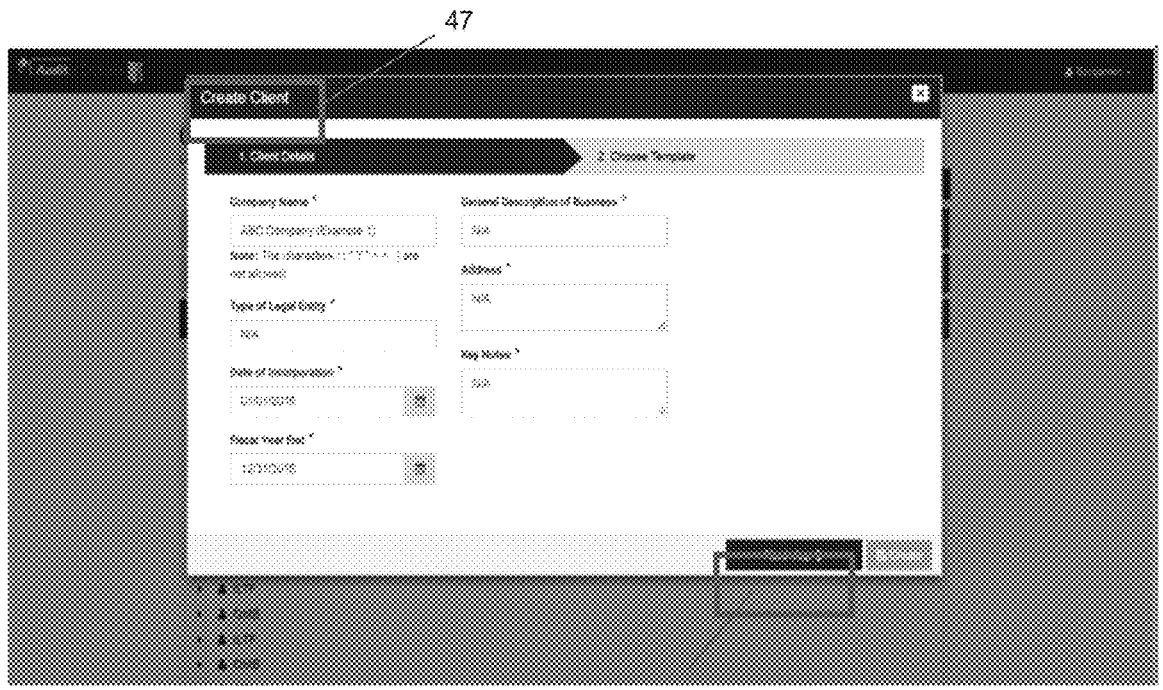
FIG. 10 is a view of the graphical user interface for inputting information in the creation of a client template.
Figure 11:
FIG. 11 is a view of the graphical user interface for choosing client template once a client template is created and stored.
Figure 12:
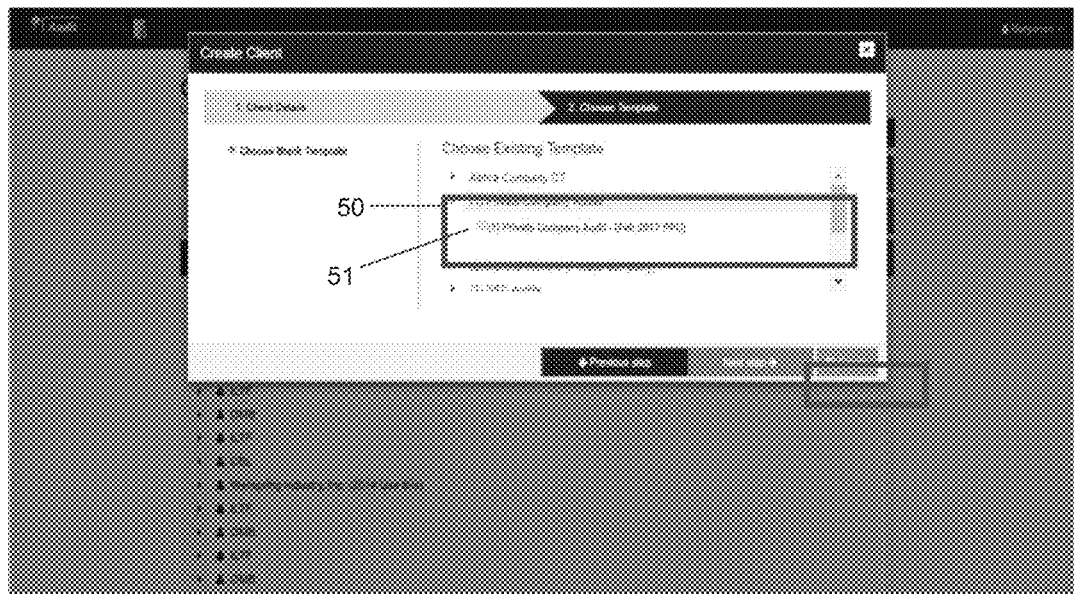
FIG. 12 is a view of the graphical user interface for selecting a created client template.
Figure 13:
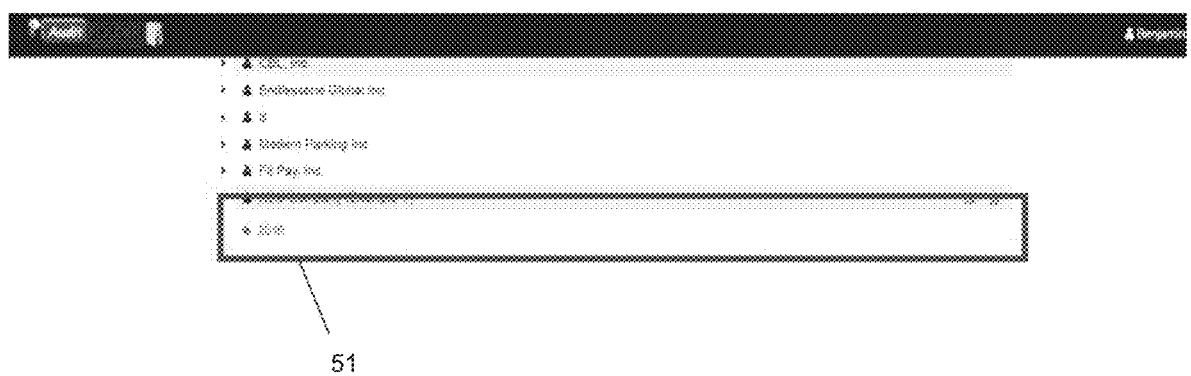
FIG. 13 is a view of the graphical user interface for modifying a workpaper.

As seen in FIG. 10, a user can create a client in the client creation detailed window 47. After the client details have been entered, the user can select the next step by clicking the client creation button 48. The client details may include a company name, type of legal entity, date of incorporation, fiscal year ended, general description of business, address and keynotes. The client details are also attributes that can be managed and stored via the relational database management system. As seen in FIG. 11, the client creation template window includes a template list 22 that can automatically populate all of the workpapers necessary for the client. As seen in FIGS. 12-13, the user can be prompted to choose an existing template out of template subfolders 50 that contain template subfolder list items 51.

Figure 14:
FIG. 14 is a view of the graphical user interface for modifying a workpaper in the cloud spreadsheet document version.
Figure 15:
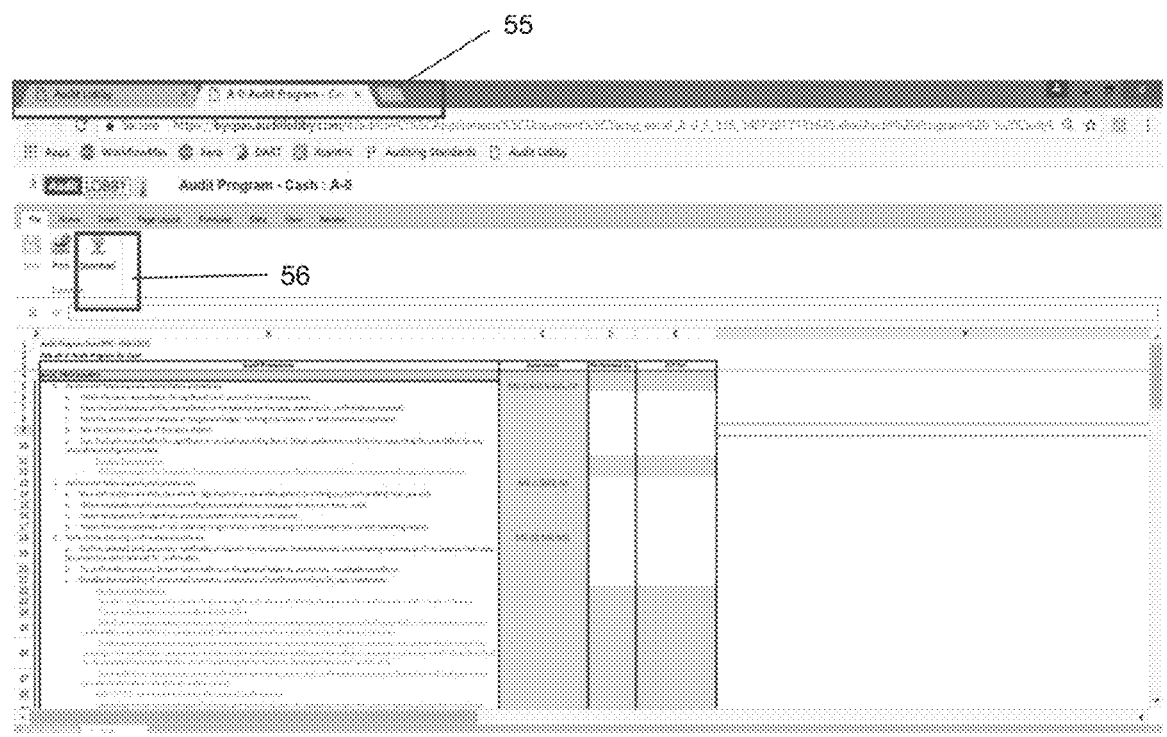
FIG. 15 is a view of the graphical user interface for opening a cloud spreadsheet document.
Figure 16:
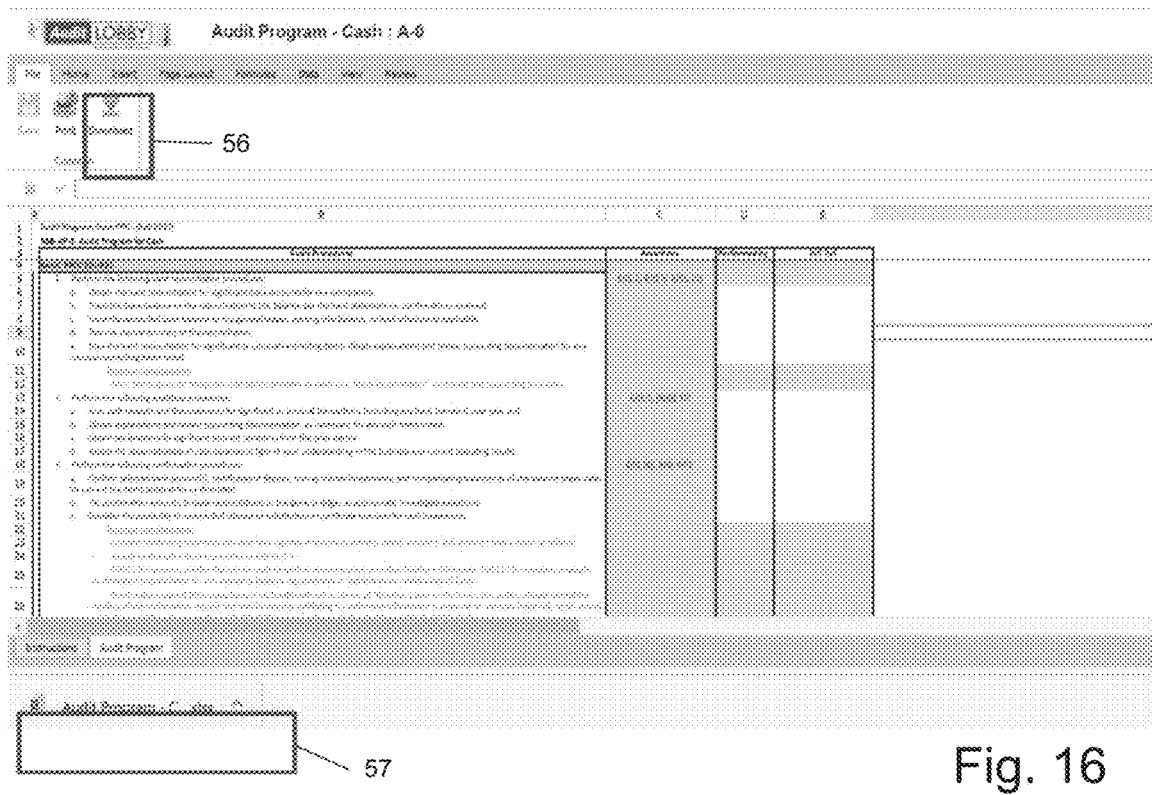
FIG. 16 is a view of the graphical user interface for opening a downloaded cloud spreadsheet document.
Figure 17:
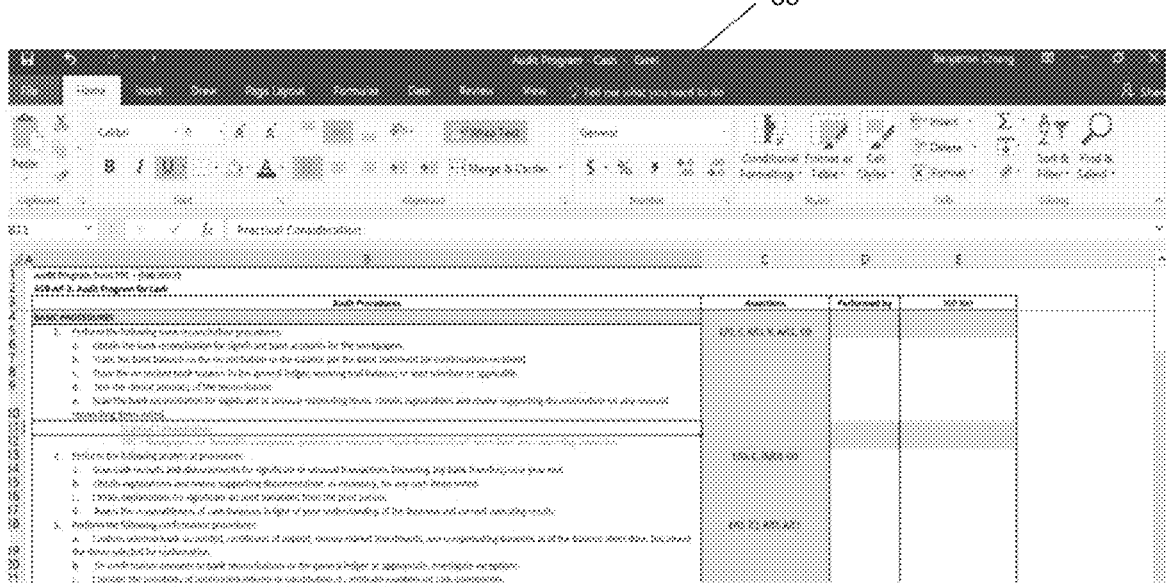
FIG. 17 is a view of the graphical interface for opening a cloud spreadsheet document in the desktop version.

An export function allows the user to export an entire folder or entire workpaper file to the operating system of the local file system. Clients may wonder what would happen if they stopped using the software, and how they would be able to retrieve their workpaper if they stopped using the software. The export function allows the user to export the entire file, such as the all of the workpapers, or to export each folder separately. When exported, the files will appear in the same sublevel is created in the document management system software. The file structure is retained, and the file properties can be output as a spreadsheet, so that the user has both the exported files and a spreadsheet with file properties. As seen in FIGS. 14-15, the application can have window tabs for appearing in multiple windows. As seen in FIG. 16, a window tab may have a download button 56 to allow downloading of documents to a client. A download button 56 allows a user to download a file that appears as a downloaded file 57. The downloaded file 57 is a document that has been received through the internet 101 to the client such as the first client 102 are the second client 103. As seen in FIG. 17, the downloaded file 57 can be a spreadsheet that can be opened in a standard spreadsheet program 58 such as Microsoft Excel™.

The workpaper importation function allows the user to import a file to replace the content in the workpaper. The document management system imports a new file to replace the old file while retaining all of the attributes of the file. The workpaper import function allows import functionality in a variety of different formats such as a spreadsheet, text editor or portable document format file. While hosted on the cloud, the document management system has a workpaper import function that imports directly from a desktop version of a file. When imported, the desktop version becomes the cloud version and replaces the content already existing. This allows users to edit existing workpaper and make significant changes of line and then import the desktop version to the server.

When importing a file, the user interacts with the front end web application framework 107 which can relate to the relational database management system interface 114 so that a local file from the local file system 108 can be replaced. The user can revert to the older version after the import has been finalized. The relational database management system retains a copy of the old file so that a user can undo the importation. The previous replaced file is retained on the server and can be reverted back. Once the file is imported, the file can be stored into local storage such as the system drive (D:\Application\Documents) and the latest file path will be updated in relational database management system to allow the user to access the file from the latest updated path. However, the old path can also be retained so that the link can be reverted back to the old file path in case the user wants to revert or otherwise undo the importation. The links representing the documents have a target path for locating the document on the local storage of the server.

The document management system does not simply replicate the operating system of the local file system. The document management system has a graphical user interface that has a link that points to the local file system. The pointing can be changed for replacing the file. While retaining the properties, such as reviewed by user, approved by user, the list of links representing the files is stored on the SQL server. The links appear as file names that are seen in the graphical user interface of the document management system application. Thus, a new file with new content can replace an old file, and appear to the user that the old file has been replaced by the new file. Traditionally, to completely replace the content in the workpaper, a user must create a new workpaper and delete the existing workpaper, which is slower and can lead to errors.

Figure 18:
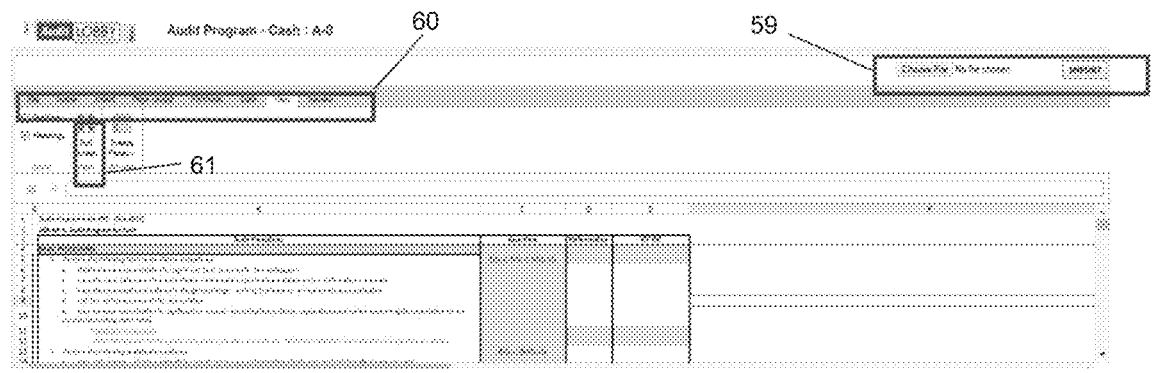
FIG. 18 is a view of the graphical user interface for importing a cloud version in the same workpaper.
Figure 19:
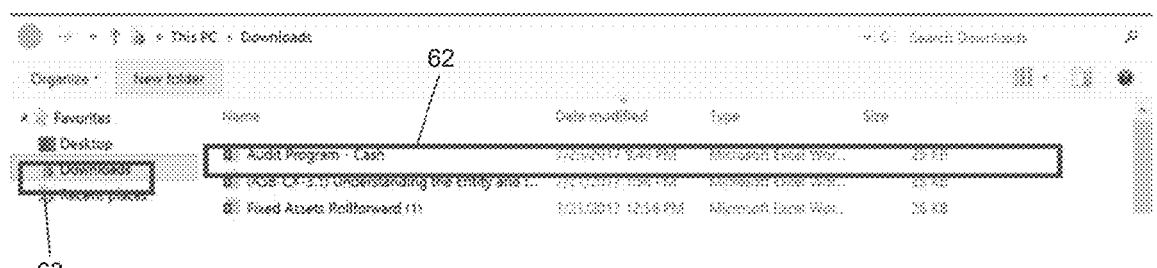
FIG. 19 is a view of the graphical user interface for choosing downloaded desktop workpaper.
Figure 20:
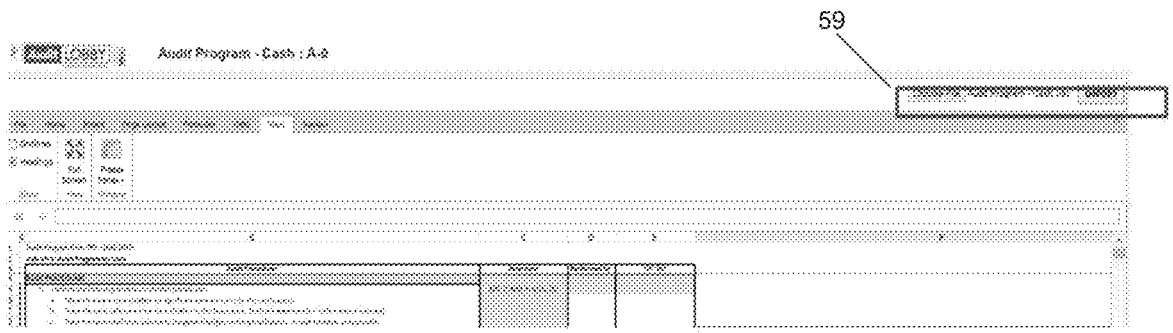
FIG. 20 is a view of the graphical user interface for choosing workpaper files to import.

As seen in FIG. 18, the import function has a file selection import interface 59 that includes a choose file button and an import button. There is also a menu function selection bar 60 in the graphical user interface that includes standard functions such as file, home, insert, page layout, formulas, data, view, and review. A full-screen view button 61 allows the user to make application program a full-screen on the client of the user. The choose file button brings up a window such as the file selection window in FIG. 19. A user can navigate on the client to the operating system file name 62 in the operating system file folder 63. The client file can then be uploaded by pressing the import button in the file selection import interface 59. When the import button is pressed, the file on the client is transferred to the server and the server recognizes the new file while retaining all file properties that were associated with the old file. The link on the document management system points to the new file that was uploaded to the server according to the operating system file name 62 of the client.

Figure 21:
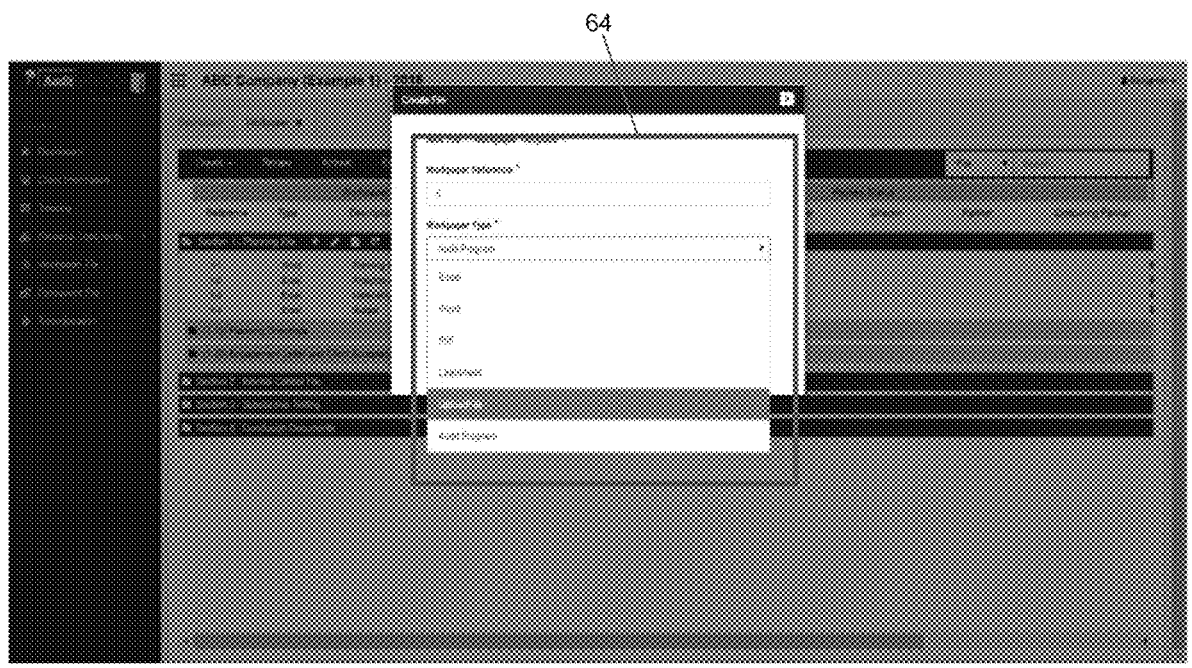
FIG. 21 is a view of the graphical user interface for uploading workpaper when creating a new file.

As seen in FIG. 21, the workpaper type selection menu 64 allows for uploading a file. The workpaper type selection menu has a selection that includes the UpLoad File selection. In this case, the document management system has an upload function for uploading multiple workpapers that appear under a single link. Typically, a workpaper is a single file such as a spreadsheet, text document or portable document format document. However, an upload function allows the user to upload multiple workpapers into a single link. When the link is clicked, the uploaded workpapers are shown in the list under the single link. The link therefore can represent more than one document or workpaper.

Figure 22:
FIG. 22 is a view of the graphical user interface for viewing uploaded workpaper.
Figure 23:
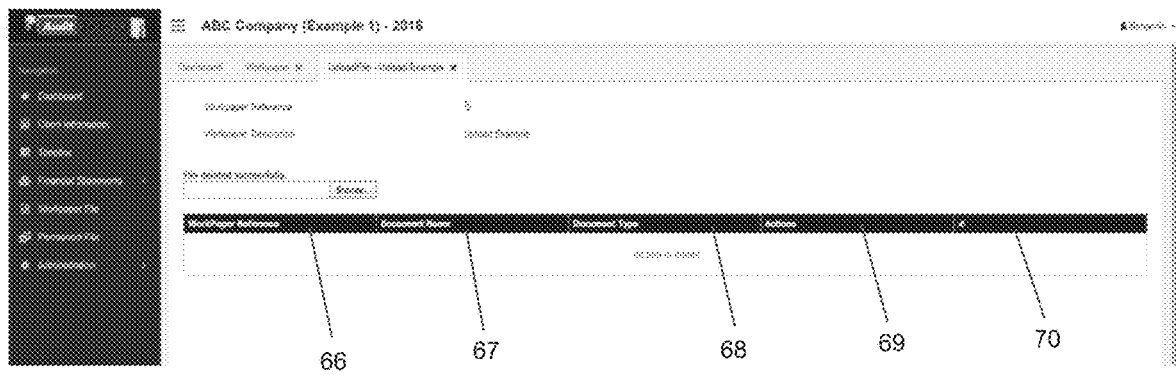
FIG. 23 is a view of the graphical user interface for opening an uploaded workpaper.
Figure 24:
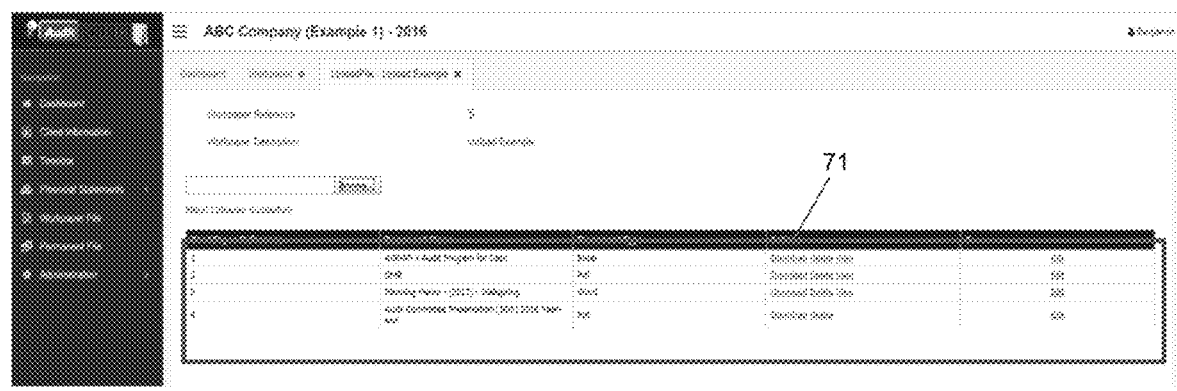
FIG. 24 is a view of the various types of files users can import for creating workpaper.

As seen in FIG. 22, a user can click on the uploaded file link 65 and expand the uploaded files located under that file link. Then a list of files are displayed as a link list 71. As seen in FIG. 23, the list of uploaded files can have attributes and attributes can have headers organized as headers of columns, while each uploaded file is displayed as an individual row. As seen in FIG. 23, the workpaper reference attribute header 66 can be a number that provides a sequential order for the file. The document name attribute header 67 can be a descriptive name for the file. The document name attribute header is independent of the operating system file name 62. The operating system file name 52 is an actual file name, whereas the document name attribute of the document name attribute header 67 represents a link to the document. The document type attribute header 68 provides an indication of the kind of document, such as text, spreadsheet, or portable document format document. An actions attribute header 69 provides actions such as download, delete or view as links to provide a variety of different operations for the user to perform on that particular document. A number attribute header has a link to edit to allow user to edit the file. The list of files are displayed as a link list 71 as seen in FIG. 24.

Figure 25:
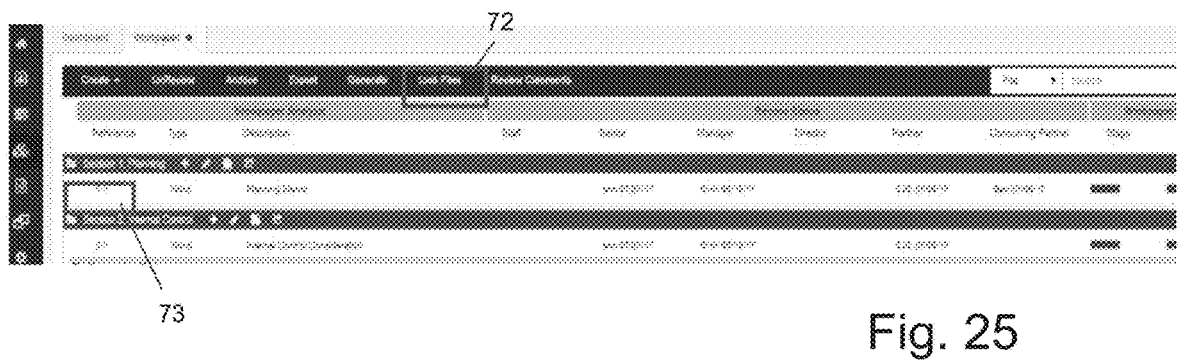
FIG. 25 is a view of the graphical user interface for the lock files function.
Figure 26:
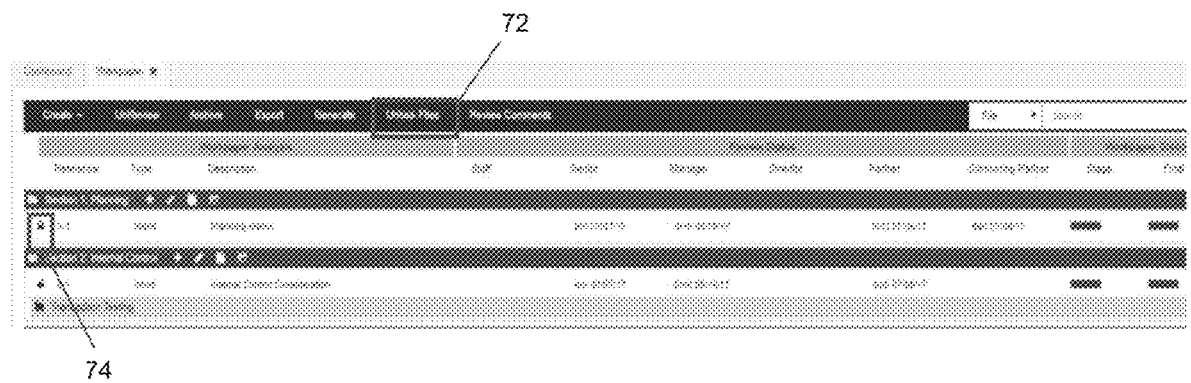
FIG. 26 is a view of the graphical user interface for when the workpaper is locked.

The document management system also has a lock file function as seen in FIG. 25. The user can select a file link to lock. Once the user locks the file, the user cannot accidentally drag the file link to a different folder. The "Lock" function locks the workpaper or files which will stop from file link from being accidentally dragged. A file locking button 72 as seen in FIGS. 25-26 allows the user to lock a file. The link list 71 in the graphical user interface has a file unlocked designation 73 and a file locked designation 74. The user can toggle the file lock attribute by clicking the file locking button 72.

Figure 27:
FIG. 27 is a view of the graphical user interface for the PBC list function.
Figure 28:
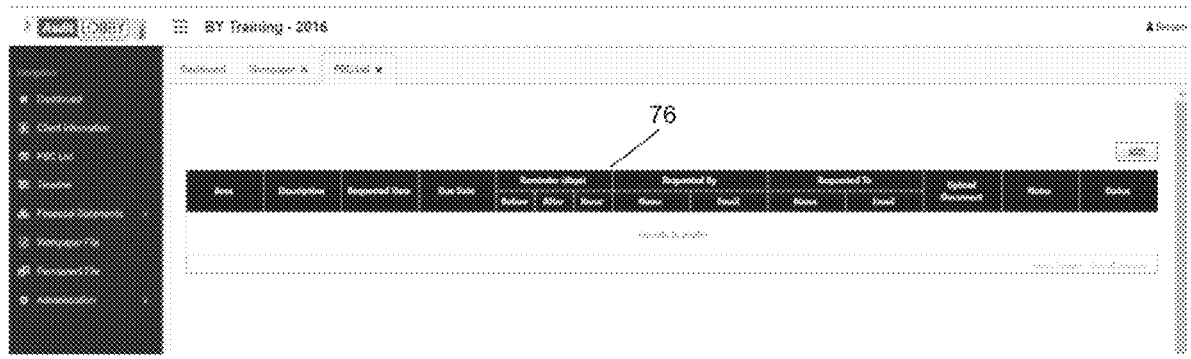
FIG. 28 is a view of the graphical user interface for the PBC function.

As seen in FIGS. 27-28, PBC is an abbreviation for 'provided by the client'. A PBC list function is a list of items that need to be provided by the client. The PBC list is a list of items requested by the auditor to the client. Traditionally, users used a spreadsheet or text editor to create the PBC List and emails directly to client. The client would then gather those information requested and could either email or use other ways to send the items requested. However, sometimes clients send files using file share, email attachments or a variety of different methods which leads to the files being lost. Therefore, the PBC function allows the user to put the PBC list directly into the document management system application and set dates when PBC items are due according to each item requested. The document management system also provides alert settings and reminds clients when PBC items are overdue. The PBC list can be imported from Excel or can be manually created in the PBC function in the document management system.

The client is also a user and have a username and password. The client is provided with the access in the access function where user is "Client". The client will receive a notification that they can access the file. When accessed, they can only see the PBC section in the software. The client can then Upload the document for each item. This allows the document management system to keep track of the documents for each item.

Figure 29:
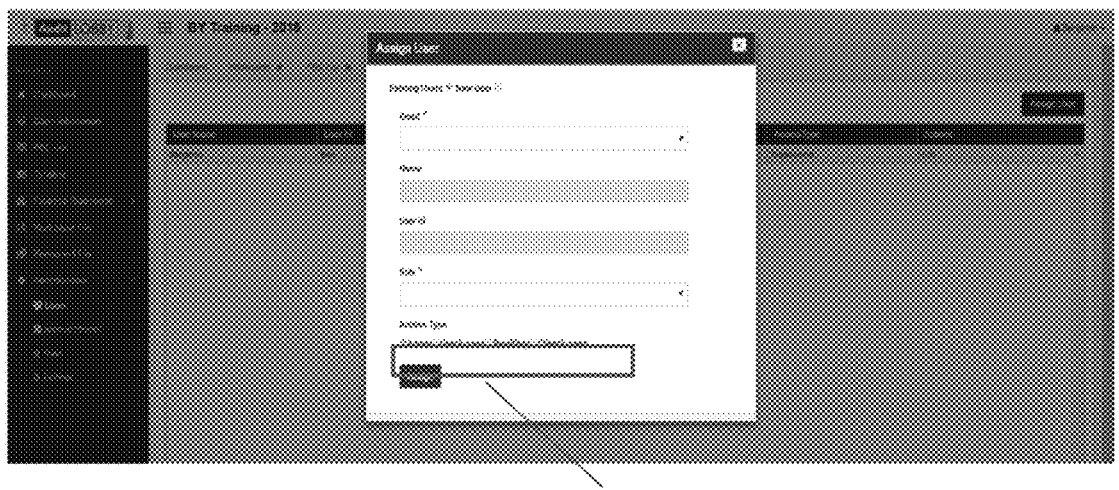
FIG. 29 is a view of the graphical user interface for the Assign User function limiting client access.
Figure 30:
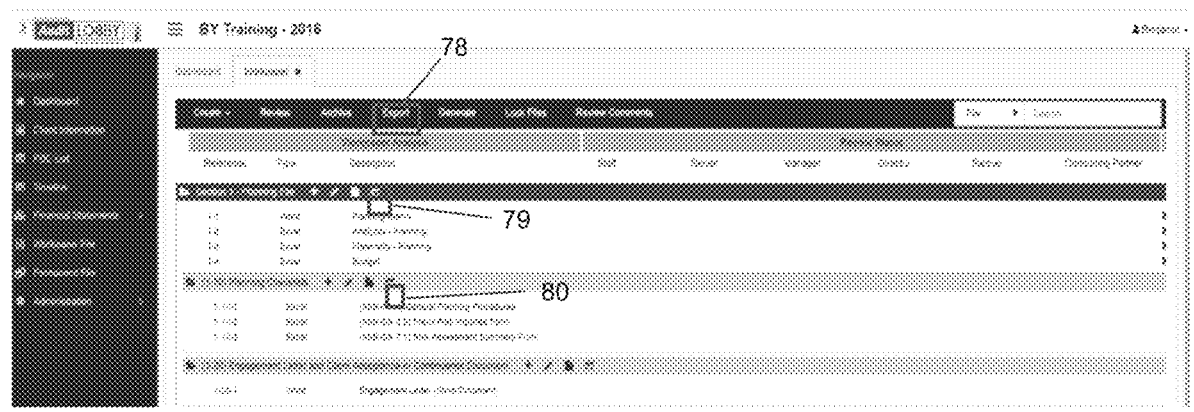
FIG. 30 is a view of the graphical user interface for exporting workpaper.
Figure 31:
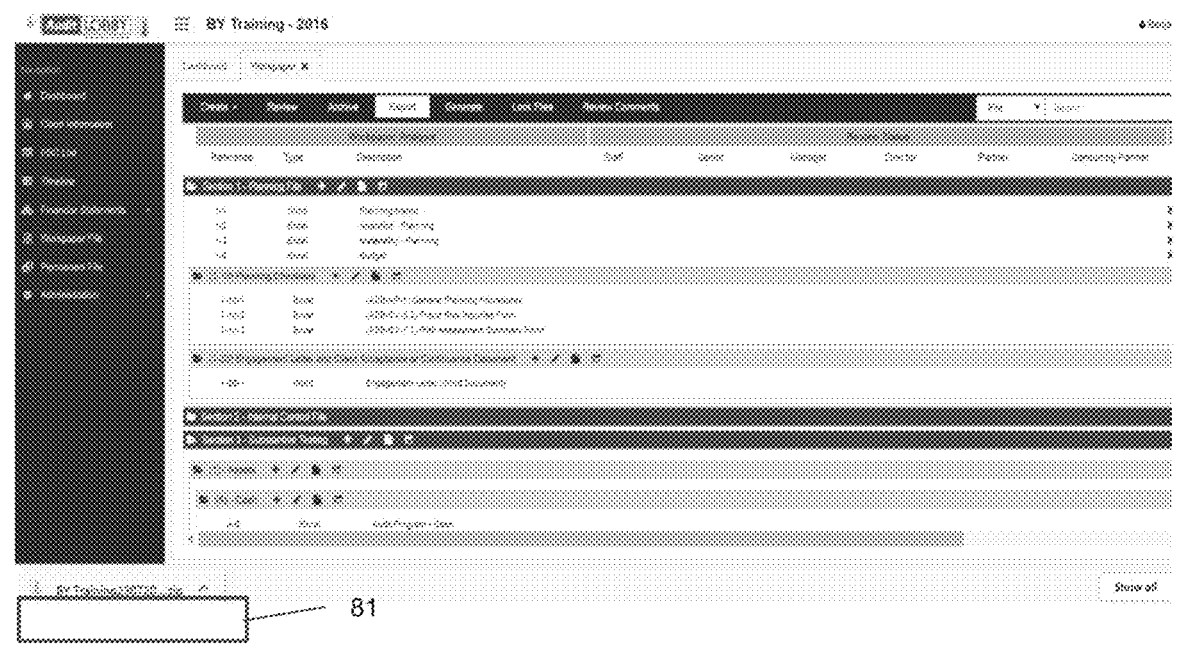
FIG. 31 is a view of the graphical user interface once workpaper exported.
Figure 32:
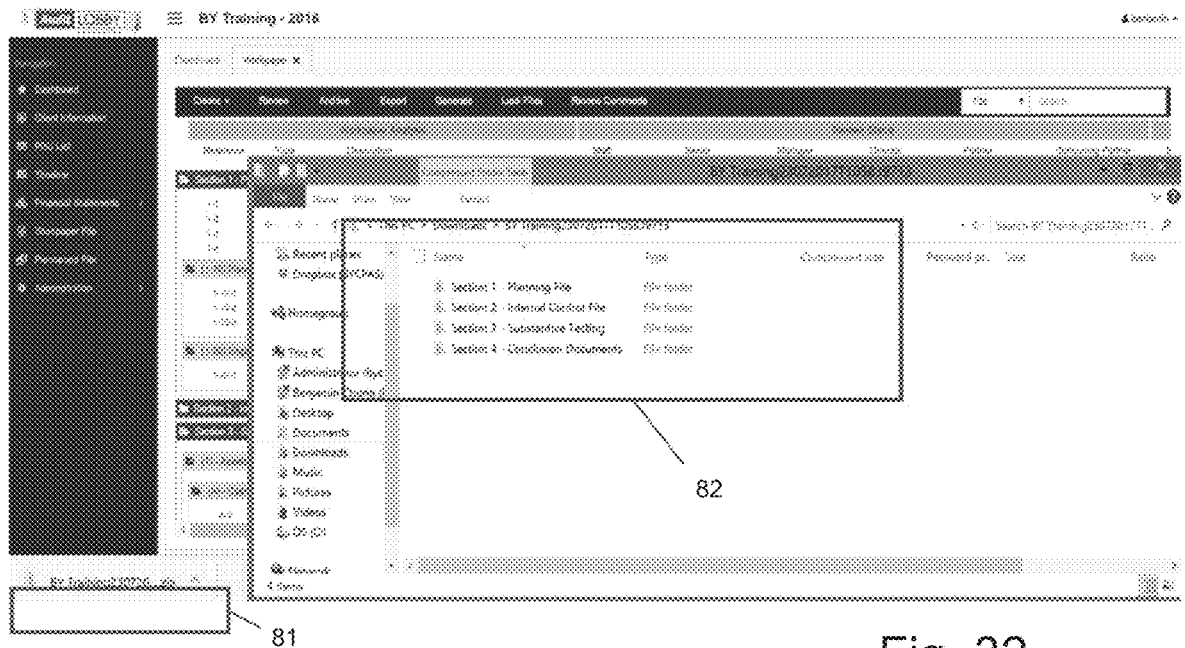
FIG. 32 is a view of the graphical user interface of the exported workpaper found in the local folder.
Figure 33:
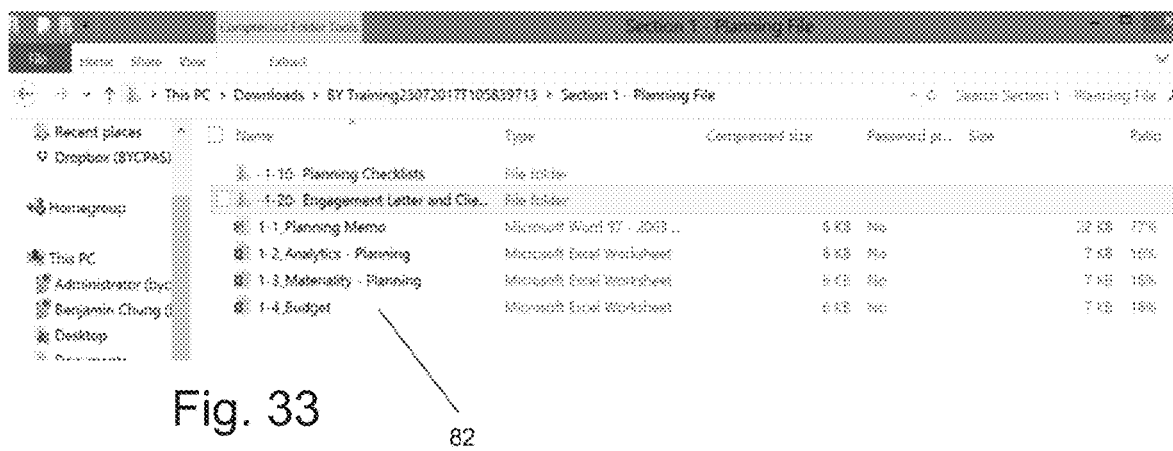
FIG. 33 is a view of the graphical user interface of the exported workpaper files.

The PBC list selection button 75 allows a user to select the PBC function. The PBC function is organized for the user as a PBC status chart 76. The PBC status chart 76 has attributes including area, description, requested date, due date, reminder before after and recurring, requested by name and email, requested to name an email, upload documents, notes and status. These attributes are assigned to the PBC items and managed on the relational database management system. As seen in FIG. 29, the user can be assigned as a client access in addition to admin, user access, and read-only. The user assignment can be selected in the user assignment menu 77. When granted client access, the client can access the server for uploading documents directly to the server.

A timeline function allows the users to set a reminder of when key items are due such as when the financial statements need to be issued to the client, when a partner needs to sign off, when documents need to be archived. The timeline function reminder can be in the form of an email sent by the document management system application to the specific user to remind the user to complete the task.

The audit program import and export function can be created as part of a workpaper function when creating a new workpaper. An audit program can be imported from a spreadsheet, or manually input. Some items in some audit programs contain notes of consideration, which do not require a signoff. The audit program also contains headers or sub-headers which do not need sign-off. A column designating rows that are "Consideration" or "header" which does not require sign-offs in the right columns.

As seen in FIGS. 30-33, different portions of the file can be exported. A user export button 78 can bring up a section such as the planning file. A section such as the planning file can have a planning file export button 79 for exporting just one section. Similarly, a user planning checklist export button can export a sub folder of the planning file such as the planning checklist file. In this case, the planning checklist file has the user planning checklist export button 80 which allows the user to export just the user planning checklist documents. When exported, the documents are compressed such as in a zip format in a compressed export file 81. The uncompressed export files 82 can be viewed after decompression of the compressed export file 81.

The invention claimed is:

1. A method for managing files comprising the steps of:
   connecting a first client and a second client to the Internet, through a web service;
   configuring a server on the web service;
   configuring an extensible web server on the server;
   configuring a local file system to connect to the extensible web server;
   configuring a relational database management system to connect to the extensible web server;
   configuring a front end web application framework on the extensible web server, wherein the front end web application framework builds a graphical user interface for the user;
   , connecting a back end web application programming interface to the front end web application framework, wherein the backend web application programming interface is also configured on the extensible web server;
   configuring a relational database management system interface on the extensible web server to access a relational database management system on the server, wherein the relational database management system interface changes file properties of files stored on the relational database management system;
   configuring a data access object on the backend web application programming interface to access the relational database management system;
   establishing links on the backend web application programming interface that are displayed on the graphical user interface, wherein documents are stored as files on a local the system, wherein the relational database management system provides a second file name shown as a link displayed on the graphical user interface; and
   providing an import function, wherein the user can select a file and replace the file that the link points to, wherein the second the name is not changed during operation of the import function, wherein the file has a set of file properties managed by the relational database management system, wherein the file properties are not changed during operation of the import function;
   maintaining a list of client templates; m. maintaining a list of workpaper templates, wherein a client template is defined as group of workpaper templates;
   including a PBC (provided by client) list; o. updating the PBC (provided by client) list;
   notify a user to upload documents according to the PBC (provided by client) list; and
   receiving an upload from a user.

2. The method of claim 1, further including the step of:
   providing an upload function that configures a link to point to a list of links to uploaded files.

3. The method of claim 2, further including the step of:
   providing an export function, wherein the files that the list of links of files point to are downloaded to a client terminal in the same hierarchy as the list of links of files.

4. The method of claim 3, further including the step of:
   providing a locking function for file links, wherein file links have a status of locked and unlocked, wherein the file links cannot be dragged and dropped by a user in the graphical user interface when in locked position.

\* \* \* \* \*